United States Patent
Cong et al.

(10) Patent No.: US 6,470,272 B2
(45) Date of Patent: Oct. 22, 2002

(54) SITUATION AWARENESS PROCESSOR

(75) Inventors: Shan Cong, Ann Arbor, MI (US); Leonard W. Behr, White Lake, MI (US); James P. Ebling, Ann Arbor, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/878,644

(22) Filed: Jun. 11, 2001

(65) Prior Publication Data

US 2002/0019697 A1 Feb. 14, 2002

Related U.S. Application Data (60) Provisional application No. 60/210,878, filed on Jun. 9, 2000.

(51) Int. Cl.$^7$ .............................. G06F 17/00; G06G 7/76
(52) U.S. Cl. ......................... 701/301; 701/96; 701/117; 340/436; 706/905
(58) Field of Search ................................. 701/301, 300, 701/96, 117, 118, 119; 340/903, 435, 436; 706/8, 905, 913

(56) References Cited

U.S. PATENT DOCUMENTS

| | | | |
|---|---|---|---|
| 2,709,804 A | 5/1955 | Chance et al. ................. 342/96 |
| 3,177,485 A | 4/1965 | Taylor, Jr. ..................... 342/96 |
| 3,603,994 A | 9/1971 | Williams et al. ............... 342/96 |
| 3,699,573 A | 10/1972 | Andrews et al. .............. 342/96 |
| 3,725,918 A | 4/1973 | Fleischer et al. ......... 343/5 EM |
| 3,869,601 A | 3/1975 | Metcalf ....................... 392/450 |
| 3,971,018 A | 7/1976 | Isbister et al. ........... 343/5 CD |
| 4,623,966 A | 11/1986 | O'Sullivan .................. 364/461 |
| 5,051,751 A | 9/1991 | Gray ........................... 342/107 |
| 5,138,321 A | 8/1992 | Hammer ....................... 342/36 |
| 5,170,440 A | 12/1992 | Cox ............................ 382/199 |
| 5,202,691 A | 4/1993 | Hicks .......................... 342/90 |
| 5,307,289 A | 4/1994 | Harris ......................... 364/400 |
| 5,406,289 A | 4/1995 | Barker et al. .................. 342/96 |
| 5,471,214 A | 11/1995 | Faibish et al. ................. 342/70 |
| 5,537,119 A | 7/1996 | Poore, Jr. ...................... 342/96 |
| 5,594,414 A | 1/1997 | Namngani ................... 340/436 |
| 5,598,164 A | 1/1997 | Reppas et al. ................. 342/70 |
| 5,627,768 A | 5/1997 | Uhlmann et al. ........... 702/109 |
| 5,631,639 A | 5/1997 | Hibino et al. ............... 340/903 |
| 5,633,642 A | 5/1997 | Hoss et al. .................... 342/70 |
| 5,684,473 A | 11/1997 | Hibino et al. ............... 340/903 |
| 5,689,264 A | 11/1997 | Ishikawa et al. .............. 342/70 |
| 5,703,593 A | 12/1997 | Campbell et al. ............. 342/96 |
| 5,948,043 A | 9/1999 | Mathis ........................ 701/208 |
| 5,959,552 A | 9/1999 | Cho ........................... 340/903 |
| 5,959,574 A | 9/1999 | Poore, Jr. ..................... 342/96 |
| 6,085,151 A | * 7/2000 | Farmer et al. ................. 342/70 |
| 6,161,071 A | 12/2000 | Shuman et al. ................ 701/48 |
| 6,226,389 B1 | 5/2001 | Lemelson et al. ........... 382/104 |
| 6,275,231 B1 | 8/2001 | Obradovich ................ 345/349 |
| 6,275,773 B1 | 8/2001 | Lemelson et al. .......... 701/301 |

OTHER PUBLICATIONS

Goebel, Greg, "An Introduction to Fuzzy Control Systems V1.0," Internet Document, source unknown, Dec. 23, 1995.
Goebel, Greg, "An Introduction to Fuzzy Control Systems V1.2," Internet Document, http://vectorsite.tripod.com/ttfuzzy.html, Oct. 1, 2000; downloaded on Sep. 14, 2001.

* cited by examiner

*Primary Examiner*—Tan Nguyen
(74) *Attorney, Agent, or Firm*—Dinnin & Dunn, P.C.

(57) ABSTRACT

A plurality of events representative of a situation in which the host vehicle is operated are selected, including at least one set of related events. Input data is provided to an inference engine from either a first set of data representative of a target in a field of view of the host vehicle, a second set of data representative of the position or motion of the host vehicle, or a third set of data is representative of an environment of said host vehicle. The inference engine operates in accordance with an inference method to generate an output representative of a probability of occurrence of at least one event of the set of events, responsive to the input data, and possibly to one or more outputs at a past time. A countermeasure may be invoked responsive to one or more outputs from one or more inference engines.

15 Claims, 3 Drawing Sheets

SITUATION AWARENESS PROCESSOR

The instant application claims the benefit of U.S. Provisional Application Serial No. 60/210,878 filed on Jun. 9, 2000 (5701-00266).

The instant application is related to U.S. application Ser. No. 09/877,493, entitled Track Map Generator, filed on Jun. 8, 2001 (5701-01265), The above-identified applications are incorporated herein by reference.

There exists a need for an improved predictive collision sensing or collision avoidance system for automotive applications that can sense and identify an environment of a host vehicle with sufficient range and accuracy so that proper countermeasures can be selected and taken sufficiently early to either avoid a collision; or to mitigate injury therefrom either to occupants of the host vehicle, or to pedestrians outside thereof. As used herein, the term predictive collision sensing system will also refer to a collision avoidance system, so as to mean a system that can sense and track targets in the environment of the host vehicle, and then either suggest, or automatically invoke, countermeasures, that would improve safety. Generally, a predictive collision sensing system tracks the motion of the host vehicle relative to its environment, or vice versa, for example, using a radar system with an associated target tracker. The environment may include both stationary and moving targets. An automotive environment is distinguished from other target tracking environments—for example, that of air or sea vessels—in that automotive vehicles are primarily operated in an environment that is constrained by roadways. There are, of course, exceptions to this, for example, parking lots or off-road driving conditions, but these exceptions generally account for a relatively small percentage of vehicular operating time, or for a relatively small risk of collisions for which there would be benefit from a predictive collision sensing system.

Figure 1:
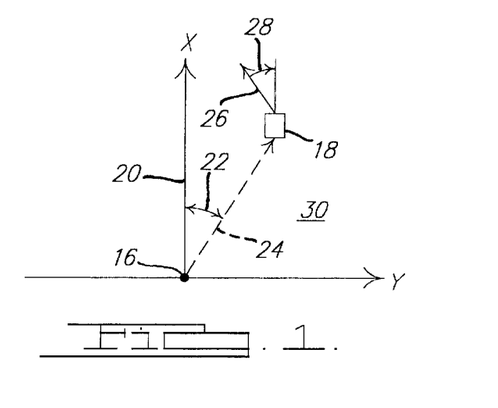
FIG. 1 illustrates a target in view of a host vehicle in a local coordinate system of the host vehicle.
Figure 2:
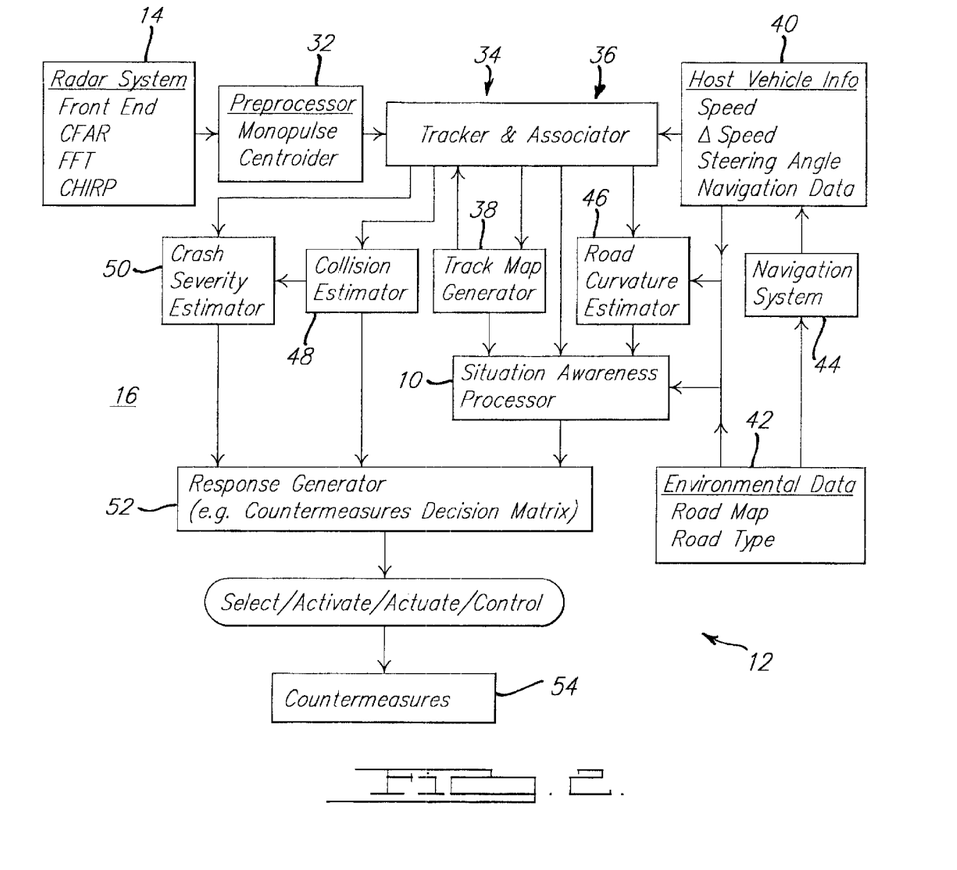
FIG. 2 illustrates a block diagram system incorporating a situation awareness processor.
Figure 3:
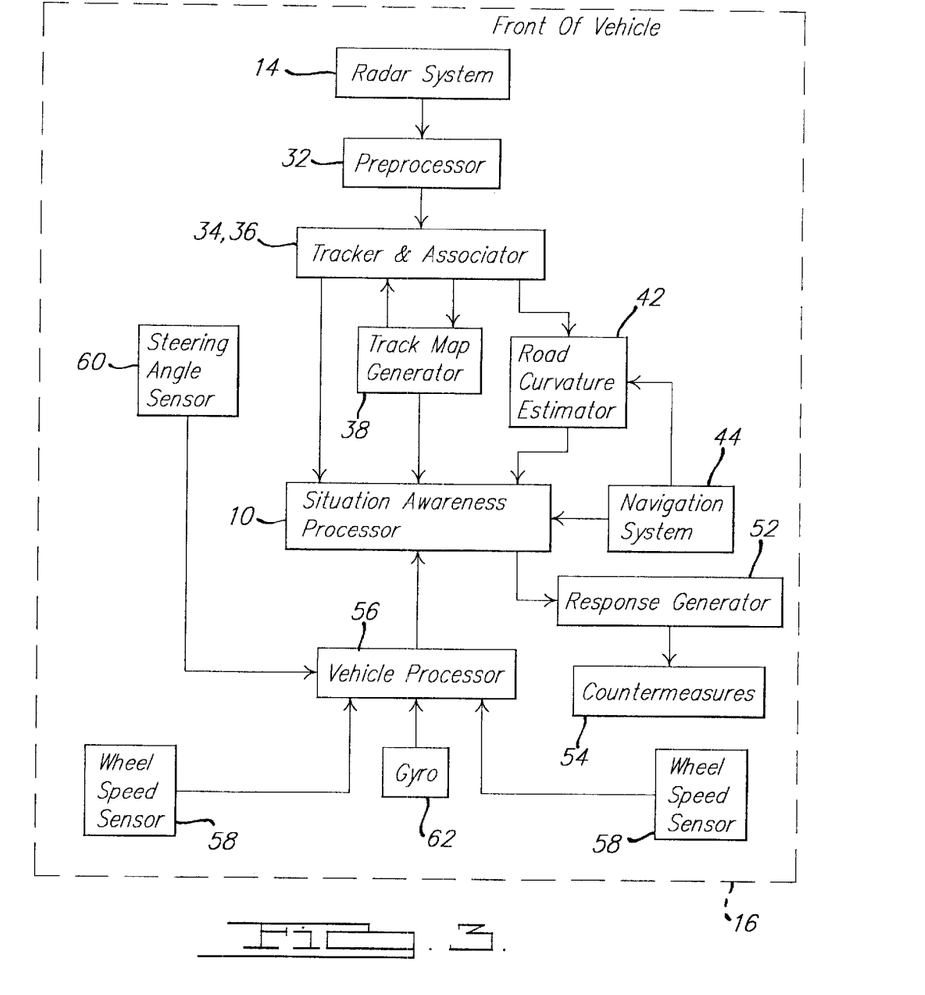
FIG. 3 illustrates a block diagram of host vehicle with a system incorporating a situation awareness processor.

Referring to FIGS. 1–3, a situation awareness processor 10 is illustrated in a radar processing system 12 that processes radar data from a radar system 14 incorporated in a host vehicle 16. Generally, the host vehicle 16 incorporates a sensor for sensing targets 18 in the environment thereof, and incorporates a system for actuating and/or controlling associated countermeasures responsive to the relative motion of the host vehicle 16 with respect to one or more targets. The sensor for sensing targets 18 is, for example, a radar or lidar sensor system that senses and tracks the location of targets 18 relative to the host vehicle 16, and predicts if a collision between the host vehicle 16 and a target 18 is likely to occur, for example, as disclosed in commonly owned U.S. Pat. No. 6,085,151 that is incorporated herein by reference.

Referring to FIG. 1, the host vehicle 16 is seen traveling in the X-direction at a host speed 20 in the environment of one or more targets 18, each at an associated bearing 22 and distance 24 relative to the host vehicle 16, each having an associated target speed 26 at an associated heading 28. Generally, the targets 18 may be either stationary, or moving, relative to the environment 30 of the host vehicle 16.

FIG. 2 illustrates a block diagram of the radar processing system 12, wherein each block in the block diagram comprises associated software modules that receive, prepare and/or process data provided by a radar system 14 mounted in the host vehicle. Data from the radar system 14 is preprocessed by a preprocessor 32 so as to generate radar data, for example, range, range rate, and azimuth angle, suitable for target tracking. The radar data typically covers a relatively wide field of view forward of the host vehicle, at least +/−5 degrees from the host vehicle's longitudinal axis, and possibly extending to +/−180 degrees, or larger, depending upon the radar and associated antenna configuration. A present exemplary system has a field of view of +/−55 degrees.

A tracker 34 converts radar output data (range, range rate & azimuth angle) into target speed and X-Y coordinates specifying the location of a target. For example, the system of U.S. Pat. No. 6,085,151 discloses a system for tracking multiple targets, and for clustering associated radar data for a single target. An associator 36 relates older track data to that from the latest scan, compiling a track history of each target.

A track map generator 38 generates a track map comprising a grid of heading and quality information from the track data as a record of the evolution of target motion relative to the host vehicle. The track map is updated with track data from subsequent targets 18 that enter the field-of-view of the host vehicle 16, and old data fades from the map with time. Accordingly, the track map provides a representation of the paths followed by targets 18 relative to the host vehicle 16, which paths are normally constrained by the associated roadways in the environment 30 of the host vehicle 16. For example, a track map generator 38 is disclosed in a separately filed U.S. application Ser. No. 09/877,493, entitled Track Map Generator, filed on Jun. 8, 2001.

A situation awareness processor 10 uses 1) the track map, 2) data acquired indicative of the position and/or motion of the host vehicle 16, i.e. host vehicle information 40, and possibly 3) environment data 42, to determine the most likely or appropriate driving situation from a set of possible driving situations. For example, the environment data 42 can include navigation data from a navigation system 44, digital maps, real-time wireless inputs of highway geometry and nearby vehicles, and data from real-time transponders such as electromagnetic or optical markers built into highways; and can be used—along with target tracking data from the tracker 34/associator 36—by a road curvature estimator 46 to provide an estimate of road curvature to the situation awareness processor 10. For example, navigation data such as the location and direction of a vehicle can be measured by a GPS receiver; by a dead reckoning system using measurements of vehicle heading from a compass or directional gyroscope, and vehicle distance and heading from wheel speed or rotation measurements, in conjunction with a map matching algorithm; or a combination thereof.

The situation awareness processor 10 stores and interprets the track map from the track map generator 38, and compares the progress over time of several target tracks. Evaluation of the relative positions and progress of the tracked targets permits identification of various driving situations, for example a location situation, a traffic situation, a driving maneuver situation, or the occurrence of sudden events. Several approaches can be used to identify the situation, for example set theoretic reasoning (using for example random set theory or evidential reasoning); Bayesian inference; or a neural network.

Examples of location situations include a divided or undivided highway, an intersection, a freeway entrance or exit, a parking lot or off-highway situation, and a stopped object on the left or right of the host vehicle. Examples of traffic situations include crowded traffic, loose traffic, or normal traffic. Examples of driving maneuver situations include target cut-in, host vehicle lane or speed changing, or target speed changing.

The situation estimated by the situation awareness processor 10, together with collision and crash severity estimates from a collision estimator 48 and a crash severity estimator 50 respectively, are used as inputs to a response generator 52 to select an appropriate countermeasure 54, for example, using a decision matrix. The decision of a particular response by the response generator 52 may be based on, for example, a rule-based system (an expert system), a neural network, or another decision means.

Examples of countermeasures 54 that can be activated include, a warning device to warn the driver to take corrective action, for example 3D audio warning (for example, as disclosed in commonly owned U.S. Pat. No. 5,979,586 that is incorporated by reference herein); various means for taking evasive action to avoid a collision, for example the engine throttle, the vehicle transmission, the vehicle braking system, or the vehicle steering system; and various means for mitigating injury to an occupant if a collision is unavoidable, for example a motorized safety belt pretensioner, or internal or external airbags. The particular one or more countermeasures 54 selected, and the manner by which that one or more countermeasures 54 are activated, actuated, or controlled, depends up the situation identified by the situation awareness processor 10, and upon the collision and crash severity estimates. By way of example, one potential scenario is that the response to encroachment into the host's lane of travel would be different depending upon whether the target is coming from the opposite direction or going the same way as the host vehicle 16, but cutting into the lane thereof. By considering the traffic situation giving rise to the threat, the countermeasures 54 can be better adapted to mitigate that threat. By using a radar system, or generally a predictive collision sensing system, to sense targets within range of the host vehicle, the countermeasures 54 may be implemented prior to an actual collision so as to either avoid a collision, or to mitigate occupant injury therefrom.

Referring to FIG. 3, the radar system 14 and radar processing system 12 are seen incorporated in host vehicle 16, wherein the host vehicle information 40 is provided by associated sensors, for example, operatively connected to a vehicle processor 56 that provides the resulting host vehicle information 40 to the situation awareness processor 10. For example, one or more wheel speed sensors 58 can provide wheel speed measurements from one or more associated wheels of the vehicle, the average of which, for laterally opposed wheels, provides a measure of vehicle speed; the difference of which provides a measure of yaw rate. Alternately, or additionally, the vehicle speed may be measured from the rotation of a transmission output shaft. A steering angle sensor 60 operatively connected to the steering shaft provides a measure of steering angle responsive to the turning of the steering wheel by the driver. The yaw rate of the host vehicle 16 may alternately, or additionally, be sensed by a gyro 62, wherein the integration of yaw rate provides a measure of the heading of the host vehicle 16.

The situational awareness processor 10 transforms the sensor information collected by various sensors into a coherent understanding of the driving environment, such that a more proper response can be invoked responsive to an emergency. Stated in another way, the situational awareness processor 10 interprets the meaning of sensor data. The inputs to the situational awareness processor 10 are transformed from a "state" domain into an "event" domain. Whereas variables in state domain are usually represented numerically, the variables in event domain are commonly represented as events and by a confidence of the occurrence thereof. The situational awareness processor 10 identifies an "event" corresponding to particular a "situation". Tables 1–3 provide examples, and associated definitions, of various events.

Inputs for identifying relevant events are obtained by processing the original sensor reports including radar reports, host vehicle speed and yaw rate, GPS host location report and digital map report. These inputs include, but are not limited to, those listed in Table 4, the information of which, except for host absolute location, type of road and approaching road structure, is interrelated by the coordinate system of FIG. 1. Host absolute location is defined in the coordinate system of the digital map, and the type of road and approach road structures are expressed in terms of events.

TABLE 1

| Event ID | | Events Related to Host Vehicle Location |
|---|---|---|
| A1 | ivided Highway | Traffic on the opposite direction is separated relatively far away |
| A2 | ndivided ighway | There is traffic on the opposite direction nearby, with most traffic parallel and at a relatively high speed |
| A3 | ntersection | Traffics with different, intersecting directions |
| A4 | reeway | Divided Highway with no Intersection, and a relatively higher speed than for a Highway |
| A5 | reeway Entrance | Connection into a freeway from another highway of any type |
| A6 | reeway Exit | Connection out of a freeway into another highway of any type |
| A7 | arking Lot | Place where there is a collection of stopped vehicles, in some cases located irregularly, and where the host vehicle is required to perform tight maneuvers |
| A8 | ff-Highway | Place where the surrounding environment is irregular, and where the host vehicle may perform almost any kind of maneuver |

TABLE 2

| Event ID | | Events Related to Traffic |
|---|---|---|
| B1 | rowded Traffic | A higher volume of traffic for a particular type of location |
| B2 | oose Traffic | A lower volume of traffic for a particular type of location |
| B3 | ormal Traffic | A standard volume of traffic for a particular type of location |
| B4 | raffic on Left | Another moving object on the left of the host |
| B5 | raffic on Right | Another moving object on the right of the host |
| B6 | raffic in Lane | Another moving object within the lane of the host |
| B7 | topped Traffic on Left | A stopped object on the left of the host |
| B8 | topped Traffic on Right | A stopped object on the right of the host |
| B9 | topped Traffic in Lane | A stopped object within the lane of the host |

TABLE 3

| Event ID | | Events Related to Relative Position Change |
|---|---|---|
| C1 | Left Traffic Cut-in | An object is cutting-in the host's lane from the left |
| C2 | Right Traffic Cut-in | An object is cutting-in the host's lane from the right |
| C3 | Host Lane Changing to Left Lane | The host vehicle is moving into the left lane |
| C4 | Host Lane Changing to Right Lane | The host vehicle is moving into the right lane |
| C5 | Left Traffic Accelerating | An object to the left of the host increases its speed |
| C6 | Right Traffic Accelerating | An object to the right of the host increases its speed |
| C7 | Lead Traffic Accelerating | An object in the front of the host increases its speed |
| C8 | Left Traffic Decelerating | An object to the left of the host decreases its speed |
| C9 | Right Traffic Decelerating | An object to the right of the host decreases its speed |
| C10 | Lead Traffic Decelerating | An object in the front of the host decreases its speed |
| C11 | Host Accelerating | The host speed increases |
| C12 | Host Decelerating | The host speed decreases |
| C13 | Traffic Turn Left | An object changes its heading to the left relative to host |
| C14 | Traffic Turn Right | An object changes its heading to the right relative to host |
| C15 | Host Turn Left | The host changes its heading to the left |
| C16 | Host Turn Right | The host changes its heading to the right |

TABLE 4

Inputs to Situation Awareness Processor

| Type | Input | Source of Information |
|---|---|---|
| Target Related Information | Number of Targets Target Heading Target Speed Target Location Relative to Host | Obtained from processing forward looking sensor(s), such as radar, lidar, or camera, with tracking algorithm |
| Host Related Information | Host Speed | Vehicle speed sensor in the transmission, or wheel speed sensors, of host vehicle |
| | Host Yaw Rate | Gyro, or differential wheel speed |
| | Host Heading | GPS, compass, gyro and/or differential wheel speed |
| | Host Absolute Location | Host navigation system: GPS; or dead reckoning from compass and wheel rotation; with map matching |
| Environment Information | Track Map | A recording of previously obtained target trajectories into grids covering the field-of-view, wherein information carried by previous tracks is saved in a smoothed manner |
| | Road Curvature | Obtained from digital map, or processing of host yaw rate and target information |
| | Type of Road Approaching Road Structure | Obtained from a digital map through matching with the host absolute location |

The output of the situational awareness processor 10 comprises a list of identified events, and associated confidence levels. The events collectively define the current driving situation. The confidence can be represented in several ways, such as probability and possibility, each generated by a different inference (reasoning) mechanism, as discussed further hereinbelow. The outputs are determined by an inference process, which is a recursive decision making process that correlates events with their associated and corresponding inputs. A decision is given in terms of a confidence for the occurrence of a particular event. A general formula for calculating the confidence of an event can is given as:

$$p_k = f(p_{k-1}, e_1, e_2, K, e_n) \quad (1)$$

where $p_k$ is the confidence level, and $e_i$ are the inputs, at time k.

Various methods can be used in the inference engines that specify the recursive updating mechanism. Among them, the most widely used are 1) Dempster-Shafer Evidential Reasoning, 2) Fuzzy Logic Reasoning, 3) Bayesian Inference, and 4) Neural Network. Random set theory can also used in place of the evidential reasoning or fuzzy logic reasoning as a more general approach.

In preparation for using a particular inference engine, the above-described events are first grouped into several classes, each containing a number of mutually exclusive atomic events. Inference is made within each class, although the output of one inference engine can be fed back as an input to another inference engine. A decision on the nature of the current driving situation is made responsive to the collective output of all inference engines. For example, Table 5 lists a set of reorganized event classes based upon the events listed in Tables 1–3.

Figure 4:
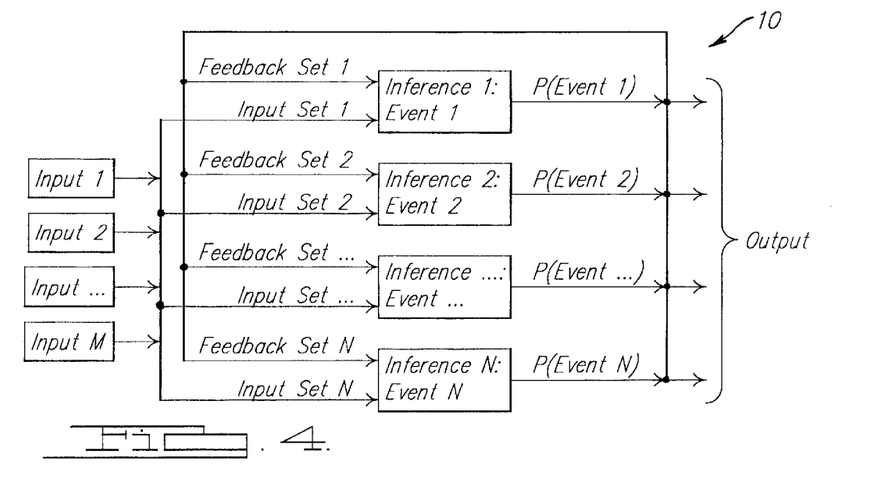
FIG. 4 illustrates a general inference process of a situation awareness processor.
Figure 5:
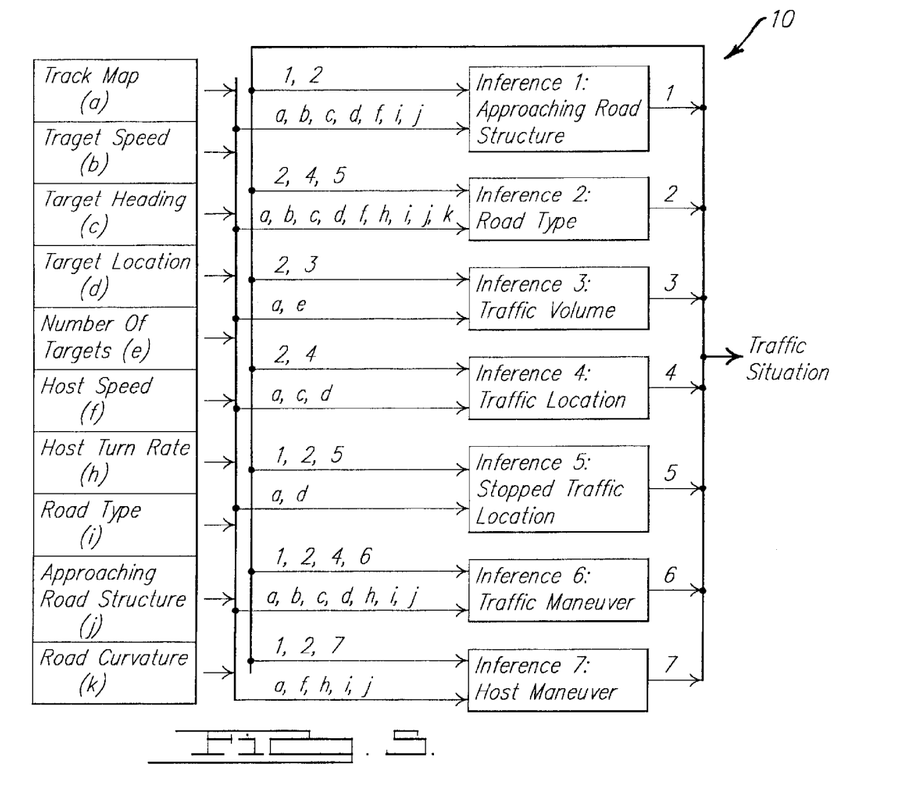
FIG. 5 illustrates an example of an inference process of a situation awareness processor.

The decision process based on the reorganized events essentially forms a networked inference engine, which is illustrated generally in FIG. 4, and which is illustrated more specifically in FIG. 5.

By way of example, the decision process is now illustrated by deriving a Bayesian inference of Approaching Road Structure. The Bayesian formula is given by:

$$p(A_i | B) = \frac{p(B|A_i)p(A_i)}{p(B)}$$
$$= \frac{p(B|A_i)p(A_i)}{\sum_{j=1}^{n} p(B|A_j)p(A_j)}$$

Denoting $e_\kappa$, $\kappa = a, b, \Lambda\ k$, as all the information available to the inference engine, and $\{e_\kappa\}$ as the collection of all available inputs, $e_a$ collectively refers to all the information carried by the track map, which can be further decomposed into a set of G grids, i.e. $e_a\{e_{ah}^\xi, e_{aq}^\xi, \xi=1, 2, \Lambda\ G\}$, where $e_{ah}^\xi$ and $e_{aq}^\xi$ are heading and quality information of grid $\xi$, respectively. For N targets, then $e_e=N$. Superscripts can be used to distinguish targets, e.g. $e_b^r$, $e_c^r$ and $e_d^r$ represent speed, heading, and location of target r, r=1, 2 . . . N, respectively. Of the target information, each $e_d^r$ contains two elements, defining a target's location in X and Y coordinates, i.e. $e_d^r = (x^r, y^r)$ Road type and approaching road structure are events in nature. Each event is from a class of possible events as defined earlier. Generally, a superscript can be used to differentiate an event from peers in its class, e.g. $e_i^\alpha$ and $e_j^\beta$ specifies a road type and an approaching road structure, respectively.

TABLE 5

| Class ID | Class Name | Events in Class | Event ID(s) |
|---|---|---|---|
| CA | Approaching Road Structure | Intersection Freeway Entrance Freeway Exit Unknown | A3 A5 A6 |

TABLE 5-continued

| Class ID | Class Name | Events in Class | Event ID(s) |
| --- | --- | --- | --- |
| CB | Road Type | Divided Highway | A1 |
| | | Undivided Highway | A2 |
| | | Freeway | A4 |
| | | Parking Lot | A7 |
| | | Off-Highway | A8 |
| | | Unknown | |
| CC | Traffic Volume | Crowded | B1 |
| | | Loose | B2 |
| | | Normal | B3 |
| | | Unknown | |
| CD | Traffic Location | Left | B4 |
| | | Right | B5 |
| | | In Lane | B6 |
| | | Unknown | |
| CE | Stopped Object Location | Left | B7 |
| | | Right | B8 |
| | | In Lane | B9 |
| | | Unknown | |
| CF | Traffic Maneuver | Cut-in From Left | C1 |
| | | Cut-in From Right | C2 |
| | | Turn Left | C13 |
| | | Turn Right | C14 |
| | | Straight Acceleration | C5, C6, C7 |
| | | Straight Deceleration | C8, C9, C10 |
| | | Nonmaneuver | |
| CG | Host Maneuver | Lane Changing to Left | C3 |
| | | Lane Changing to Right | C4 |
| | | Turn Left | C15 |
| | | Turn Right | C16 |
| | | Straight Acceleration | C11 |
| | | Straight Deceleration | C12 |
| | | Nonmaneuver | |

The output of the inference network comprises the seven events from the seven classes defined earlier, wherein event is denoted as S, subscripts are used to denote the class of an event, and superscript are used to denote the intended event of the class specified by the subscript. Accordingly, $S_\eta^\lambda$ is an output event for class $\eta$ and event $\lambda$ in the class. For example, if $\eta=1$, $\lambda=2$, then $S_\eta^\lambda$ means freeway entrance.

Given the above definitions, the Bayesian inference for Approaching Road Structure can be derived as follows. Under Bayesian framework, the outcome of an inference is the posterior probability of a given event. For approaching road structures, the probabilities to be evaluated are $S_1^\lambda$, $\lambda=1, 2, 3, 4$, given the collection of evidence $\{e_\kappa\}$ and knowledge of a related event in class $S_2$, are given by:

$$p(S_1^\lambda | S_2^{\lambda_0}, \{e_\kappa\}) = \frac{p(\{e_\kappa\} | S_1^\lambda, S_2^{\lambda_0}) p(S_1^\lambda | S_2^{\lambda_0})}{\sum_{\lambda_1=1}^{4} p(\{e_\kappa\} | S_1^{\lambda_1}, S_2^{\lambda_0}) p(S_1^{\lambda_1} | S_2^{\lambda_0})}$$

wherein, $\lambda_0=1, 2, \Lambda$ 6 is the index for events belonging to the road type class.

Using the previously obtained $p(S_1^\lambda | S_2^{\lambda_0}, \{e_\kappa\})$ to approximate current $p(S_1^\lambda | S_2^{\lambda_0})$, provides the following recursive probability updating equation:

$$p_k(S_1^\lambda | S_2^{\lambda_0}, \{e_k\}) = \frac{p(\{e_k\} | S_1^\lambda, S_2^{\lambda_0}) p_{k-1}(S_1^\lambda | S_2^{\lambda_0}, \{e_k\})}{\sum_{\lambda_1=1}^{4} p(\{e_k\} | S_1^{\lambda_1}, S_2^{\lambda_0}) p_{k-1}(S_1^{\lambda_1} | S_2^{\lambda_0}, \{e_k\})}$$

wherein $p(\{e_\kappa\}|S_1^\lambda, S_2^{\lambda_0})$ is the probability density of set $\{e_\kappa\}$ given the condition that events $S_1^\lambda$ and $S_2^{\lambda_0}$ are true.

Considering the individual elements in $\{e_\kappa\}$ gives:

$$p(\{e_\kappa\} | S_1^\lambda, S_2^{\lambda_0}) = p(e_a, \{e_b^r, e_c^r, e_d^r\}, e_f, e_i^\alpha, e_j^\beta | S_1^\lambda, S_2^{\lambda_0}) =$$
$$p(e_a | S_1^\lambda, S_2^{\lambda_0}) p(e_f | S_1^\lambda, S_2^{\lambda_0}) p(e_i^\alpha | S_1^\lambda, S_2^{\lambda_0}) p(e_j^\beta | S_1^\lambda, S_2^{\lambda_0}) \times$$
$$\prod_{r=1}^{N} p(e_b^r | S_1^\lambda, S_2^{\lambda_0}) p(e_c^r | S_1^\lambda, S_2^{\lambda_0}) p(e_d^r | S_1^\lambda, S_2^{\lambda_0})$$

wherein individual conditional probabilities/probability densities can be found as:

$$p(e_a | S_1^\lambda, S_2^{\lambda_0}) \quad (1)$$

$$p(e_a | S_1^\lambda, S_2^{\lambda_0}) =$$
$$\prod_{\xi=1}^{G} [p(e_{ah}^\xi | S_1^\lambda, S_2^{\lambda_0}, \xi = \text{TRUE}) p(\xi = \text{TRUE} | S_1^\lambda, S_2^{\lambda_0}) +$$
$$p(e_{ah}^\xi | S_1^\lambda, S_2^{\lambda_0}, \xi = \text{FALSE}) p(\xi = \text{FALSE} | S_1^\lambda, S_2^{\lambda_0})]$$

As $p(\xi = \text{TRUE} | S_1^\lambda, S_2^{\lambda_0})] =$
$$e_{aq}^\xi \text{ and } p(\xi = \text{FALSE} | S_1^\lambda, S_2^{\lambda_0})] = 1 - e_{aq}^\xi, \text{ then}$$

$$p(e_a | S_1^\lambda, S_2^{\lambda_0}) = \prod_{\xi=1}^{G} [p(e_{ah}^\xi | S_1^\lambda, S_2^{\lambda_0}, \xi = \text{TRUE}) e_{aq} +$$
$$p(e_{ah}^\xi | S_1^\lambda, S_2^{\lambda_0}, \xi = \text{FALSE})(1 - e_{aq}^\xi)].$$

A suitable way to model $p(e_{ah}^\xi | S_1^\lambda, S_2^{\lambda_0}, \xi = \text{TRUE})$ is to a use Guassian mixture, i.e. an approximation involving a summation of several Guassian distributions:

$$p(e_{ah}^\xi | S_1^\lambda, S_2^{\lambda_0}, \xi = \text{TRUE}) = \frac{1}{N_f} \sum_{i=1}^{N_f} \frac{1}{2\pi\sigma_i} e^{-\frac{(e_{ah}^\xi - \mu_i)^2}{2\sigma_i^2}}$$

where $N_f$ is the number of features selected for an approaching road structure. For example, the following parameters may be chosen for an intersection: $N_f=3$, $\mu_1=0°$, $\mu_2=90°$, $\mu_3=90°$, and $\sigma_1=\sigma_2=\sigma_3=10°$.

The distribution $p(e_{ah}^\xi | S_1^\lambda, S_2^{\lambda_0}, \xi=\text{FALSE})$ may be modeled as a uniform distribution, e.g., $$p(e_{ah}^\xi | S_1^\lambda, S_2^{\lambda_0}, \xi = \text{FALSE}) = \frac{1}{180°}.$$

(2) $p(e_b^r | S_1^\lambda, S_2^{\lambda_0})$, $p(e_c^r | S_1^\lambda, S_2^{\lambda_0})$, $p(e_d^r | S_1^\lambda, S_2^{\lambda_0})$ and $p(e_f | S_1^\lambda, S_2^{\lambda_0})$ can be handled similar to $p(e_a | S_1^\lambda, S_2^{\lambda_0})$.

(3) $p(e_i^\alpha | S_1^\lambda, S_2^{\lambda_0})$:

Probability of event-type input $e_i^\alpha$ can be decided as $$p(e_i^\alpha | S_1^\lambda, S_2^{\lambda_0}) = \begin{cases} p(e_i^\alpha = \text{TRUE}), & \text{if } S_2^{\lambda_0} = e_i^\alpha \\ 1 - p(e_i^\alpha = \text{TRUE}), & \text{if } S_2^{\lambda_0} \neq e_i^\alpha \end{cases}$$

Where $p(e_i^\alpha=\text{TRUE})$ can be obtained by the quality measure of GPS/map matching.

(4) $p(e_j^\beta | S_1^\lambda, S_2^{\lambda_0})$ can be handled similar to $p(e_i^\alpha | S_1^\lambda, S_2^{\lambda_0})$.

The actual forms and parameters of above probability terms would be obtained based on experiments, with simplification to reduce computational burden.

The above inference engine can be replaced by any of the other three widely used reasoning techniques, namely fuzzy logic reasoning, Dempster-Shafer evidential reasoning and neural networks. Particularly, a collection of atomic events can be specified based on the classes of events to be recognized, for example, as are illustrated in Table 6.

TABLE 6

| Set ID | Set Name | Events in Set ID | Name | Event ID(s) | Definition |
|---|---|---|---|---|---|
| SA | Approaching Road Structure | SA1 | Intersection | 3 | Traffics at different directions meet each other |
| | | SA2 | Entrance | 5 | A road connected into the host's road in a near parallel manner |
| | | SA3 | Exit | 6 | A road connected out of the host's road in a near parallel manner |
| SB | Road Type | SB1 | Divided Road | 1 | Road with only one direction of traffic |
| | | SB2 | Undivided Road | 2 | Traffic with opposite direction is close |
| | | SB3 | Highway | 1, A2 | Road of any type with higher speed and traffics are parallel |
| | | SB4 | Parking Lot | 7 | Same as A7 |
| | | SB5 | Off-Highway | 8 | Same as A8 |
| SC | Traffic Volume | SC1 | Crowded | 1 | Same as B1 |
| | | SC2 | Loose | 2 | Same as B2 |
| | | SC3 | Normal | 3 | Same as B3 |
| SD | Traffic Location | SD1 | Left | 4, B7 | An object is on the left of the host |
| | | SD2 | Right | 5, B8 | An object is on the right of the host |
| | | SD3 | In Lane | 6, B9 | An object is in the same lane of the host |
| SE | Object Nature | SE1 | Moving | | The location of an object is changing relative to the ground |
| | | SE2 | Stopped | | The location of an object is not changing relative to the ground |
| SF | Traffic Maneuver | SF1 | Turn Left | 13 | Heading of the velocity of an object changes to the left of the host |
| | | SF2 | Turn Right | 14 | Heading of the velocity of an object changes to the right of the host |
| | | SF3 | Acceleration | 5, C6, C7 | Object speed increases |
| | | SF4 | Deceleration | 8, C9, C10 | Object speed decreases |
| SG | Host Maneuver | SG1 | Turn Left | 15 | Heading of the velocity of host changes to the left of the host |
| | | SG2 | Turn Right | 16 | Heading of the velocity of host changes to the right of the host |
| | | SG3 | Acceleration | 11 | Host speed increases |
| | | SG4 | Deceleration | 12 | Host speed decreases |
| | | SG5 | Lane Change | 3, C4 | Host moves to another lane |

Note that the defined atomic events are not exactly the same as the situations. Some are intersections of several events, some are unions of events, some are actually part of a situation, and some have not been defined. However, these atomic sets collectively can represent the situations defined earlier.

Given the defined sets of atomic events, the output events can be obtained by joining the atomic events, as illustrated in Table 7.

TABLE 7

| | | |
|---|---|---|
| A1 = (SB1, SB3) | B1 = (SC1) | C1 = (B4, SF1) |
| A2 = (SB2, SB3) | B2 = (SC2) | C2 = (B5, SF2) |
| A3 = (SA1) | B3 = (SC3) | C3 = (SG1, SG5) |
| A4 = (SB1, SB2, SA1) | B4 = (SD1, SE1) | C4 = (SG2, SG5) |
| A5 = (A4, SA2) | B5 = (SD2, SE1) | C5 = (SF3, B4) |
| A6 = (A4, SA3) | B6 = (SD3, SE1) | C6 = (SF3, B5) |
| A7 = (SB4) | B7 = (SD1, SE2) | C7 = (SF3, B6) |
| A8 = (SB5) | B8 = (SD2, SE2) | C8 = (SF4, B4) |
| | B9 = (SD3, SE2) | C9 = (SF4, B5) |
| | | C10 = (SF4, B6) |
| | | C11 = (SG3) |
| | | C12 = (SG4) |
| | | C13 = (SF1) |
| | | C14 = (SF2) |
| | | C15 = (SG1) |
| | | C16 = (SG2) |

The Dempster-Schafer mass functions assigned to the events can be obtained based on experiments. Mass updating can also obtained based on evidential reasoning theory.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A method of identifying a situation in which a host vehicle is operated, comprising:

a. selecting a plurality of events, wherein each event of said plurality of events is representative of a situation in which the host vehicle is operated, and at least two of said events are different from one another;

b. selecting at least one set of said events that are related to a situation in which the host vehicle is operated;

c. providing for a set of data from at least one of a first set of data, a second set of data and a third set of data, wherein said first set of data is representative of a target in a field of view of the host vehicle, said second set of data is representative of the position or motion of the host vehicle, and said third set of data is representative of an environment of said host vehicle;

d. selecting an inference method for a first inference engine, wherein said inference engine comprises at least one input and an output;

e. selecting as a first input to said inference engine at least one element of said first set of data, said second set of data and said third set of data; and f. generating a first output from said first inference engine responsive to said first input, wherein said first output is representative of a probability of occurrence of at least one event of said set of said events.

2. A method of identifying a situation in which a host vehicle is operated, as recited in claim 1, wherein a plurality of said events are related to a location of the host vehicle.

3. A method of identifying a situation in which a host vehicle is operated, as recited in claim 2, wherein each of said plurality of said events related to said location of the host vehicle is a situation selected from an operation of the host vehicle in a vicinity of a divided or undivided highway; an operation of the host vehicle in a vicinity of an intersection, an operation of the host vehicle in a vicinity of a freeway, an operation of the host vehicle in a vicinity of an entrance or exit to a freeway entrance; an operation of the host vehicle in a vicinity of a parking lot; and an operation of the host vehicle in an off-highway environment.

4. A method of identifying a situation in which a host vehicle is operated, as recited in claim 1, wherein a plurality of said events are related to a traffic situation.

5. A method of identifying a situation in which a host vehicle is operated, as recited in claim 4, wherein each of said plurality of said events related to a traffic situation comprises operation of the host vehicle in an environment selected from crowded, loose or normal traffic; a moving or stationary object to the left or right of the host vehicle; and a moving or stationary object in a lane of the host vehicle.

6. A method of identifying a situation in which a host vehicle is operated, as recited in claim 1, wherein a plurality of said events are related to a relative position change of a target with respect to the host vehicle.

7. A method of identifying a situation in which a host vehicle is operated, as recited in claim 6, wherein each of said plurality of said events related to a relative position change of a target with respect to the host vehicle is selected from an object cutting in a lane of the host vehicle from the left or right of the host vehicle; the host vehicle changing lanes to the left or right; a change in speed of traffic to the left or right of the host vehicle; a change in speed of traffic in the same lane as the host vehicle; a change in speed of the host vehicle; a change in direction of traffic to the left or right; and a change in direction of the host vehicle to the left or right.

8. A method of identifying a situation in which a host vehicle is operated, as recited in claim 1, wherein at least two events of said set of events are mutually exclusive.

9. A method of identifying a situation in which a host vehicle is operated, as recited in claim 1, wherein said first set of data is selected from a count of targets in a field of view of the host vehicle, a target heading, a target speed, and a target location relative to the host vehicle, and at least a portion of said first set of data is generated by a tracker operatively coupled to a radar system.

10. A method of identifying a situation in which a host vehicle is operated, as recited in claim 1, wherein said second set of data is selected from a speed of the host vehicle, a yaw rate of the host vehicle, a heading of the host vehicle, and a location of the host vehicle.

11. A method of identifying a situation in which a host vehicle is operated, as recited in claim 10, further comprising providing for reading said location of the host vehicle from a navigation system.

12. A method of identifying a situation in which a host vehicle is operated, as recited in claim 1, wherein said third set of data is selected from a track map representative of a composite path of targets in an environment of the host vehicle, a curvature or type of a road upon which the host vehicle is operated, data representative of a fixed structure in the field of view of the host vehicle, and a digital map of a road surface, wherein said track map is generated by a track map generator from data is generated by a tracker operatively coupled to a radar system.

13. A method of identifying a situation in which a host vehicle is operated, as recited in claim 1, wherein said inference method is selected from a Dempster-Shafer evidential reasoning method, a fuzzy logic reasoning method, a Bayesian inference method, a neural network and a reasoning method based on random set theory.

14. A method of identifying a situation in which a host vehicle is operated, as recited in claim 1, further comprising:
  a. selecting as a second input to said inference engine an output from an inference engine, wherein said output is at a past time relative to said first input; and
  b. generating an output from said first inference engine responsive to said first and second inputs.

15. A method of identifying a situation in which a host vehicle is operated, as recited in claim 1, further comprising selecting a countermeasure responsive to at least one said output of at least one said inference engine.

* * * * *

UNITED STATES PATENT AND TRADEMARK OFFICE
CERTIFICATE OF CORRECTION

PATENT NO. : 6,470,272 B2
DATED : October 22, 2002
INVENTOR(S) : Shan Cong et al.

It is certified that error appears in the above-identified patent and that said Letters Patent is hereby corrected as shown below:

Column 1,
Line 5, "(5701-00266)" should be deleted;
Line 7, -- , now U.S. Pat. No. 6,420,997 -- should be inserted after "493"; and
Line 8, "(5701-00265)" should be deleted.

Column 2,
Line 38, -- , now U.S. Pat. No. 6,420,997 -- should be inserted after "493".

Column 4,
Lines 33-46, the following changes should be made in consecutive rows of the second column of Table 1:
"ivided Highway" should be changed to -- Divided Highway --;
"ndivided ighway" should be changed to -- Undivided Highway --;
"ntersection" should be changed to -- Intersection --;
"reeway" should be changed to -- Freeway --;
"reeway Entrance" should be changed to -- Freeway Entrance --;
"reeway Exit" should be changed to -- Freeway Exit --;
"arking Lot" should be changed to -- Parking Lot --; and
"ff-Highway" should be changed to -- Off-Highway --;
Line 37, "Traffics" should be changed to -- Traffic -- in the third column of Table 1;

Column 4, line 56 through Column 5, line 8,
The following changes should be made in consecutive rows of the second column of Table 2;
"rowded Traffic" should be changed to -- Crowded Traffic --;
"oose Traffic" should be changed to -- Loose Traffic --;
"ormal Traffic" should be changed to -- Normal Traffic --;
"raffic on Left" should be changed to -- Traffic on Left --;
"raffic on Right" should be changed to -- Traffic on Right --;
"raffic in Lane" should be changed to -- Traffic in Lane --;
"topped Traffic on Left" should be changed to -- Stopped Traffic on Left --; "topped Traffic on Right" should be changed to -- Stopped Traffic on Right --; and "topped Traffic in Lane" should be changed to -- Stopped Traffic in Lane --.

Column 6,
Line 21, "can" should be deleted;
Line 24, "$K$" should be changed to -- ... -- in the equation; and
Lines 58 and 62, "$\Lambda$" should be changed to -- ... --.

UNITED STATES PATENT AND TRADEMARK OFFICE
CERTIFICATE OF CORRECTION

PATENT NO. : 6,470,272 B2
DATED : October 22, 2002
INVENTOR(S) : Shan Cong et al.

It is certified that error appears in the above-identified patent and that said Letters Patent is hereby corrected as shown below:

Column 7,
Line 56, "given" should be changed to -- which, given --.
Line 64, "Λ" should be changed to -- ... --.

Column 8,
Line 24, "(1)" should be moved to the left-hand side of the column, before the equation.

Column 9,
Line 8, " Where" should be changed to --where--;

Column 9, line 27 through Column 10, line 11,
The following changes should be made in consecutive rows of the fifth column of Table 6:
"3" should be changed to -- A3 --;
"5" should be changed to -- A5 --;
"6" should be changed to -- A6 --;
"1" should be changed to -- A1 --;
"2" should be changed to -- A2 --; "1, A2" should be changed to -- A1, A2 --;
"7" should be changed to -- A7 --;
"8" should be changed to -- A8 --;
"1" should be changed to -- B1 --;
"2" should be changed to -- B2 --;
"3" should be changed to -- B3 --;
"4, B7" should be changed to -- B4, B7 --;
"5, B8" should be changed to -- B5, B8 --;
"6, B9" should be changed to -- B6, B9 --;
"13" should be changed to -- C13 --;
"14" should be changed to -- C14 --; "5, C6, C7" should be changed to -- C5, C6, C7 --;
"8, C9, C10" should be changed to -- C8, C9, C10 --;
"15" should be changed to -- C15 --;
"16" should be changed to -- C16 --;
"11" should be changed to -- C11 --;
"12" should be changed to -- C12 --; and "3, C4" should be changed to -- C3, C4 --;
Line 27, "Traffics at different directions meet" should be changed to -- Traffic at different directions meets -- in the sixth column of Table 6; and line 38, "traffics are" should be changed to -- traffic is -- in the sixth column of Table 6;

UNITED STATES PATENT AND TRADEMARK OFFICE
CERTIFICATE OF CORRECTION

PATENT NO.   : 6,470,272 B2
DATED        : October 22, 2002
INVENTOR(S)  : Shan Cong et al.

It is certified that error appears in the above-identified patent and that said Letters Patent is hereby corrected as shown below:

Column 11,
Lines 2 and 4, "said inference" should be changed to -- said first inference --.

Column 12,
Line 29, "is" should be deleted.
Line 40, "said inference" should be changed to -- said first inference --.

Signed and Sealed this

Fourteenth Day of June, 2005

JON W. DUDAS
*Director of the United States Patent and Trademark Office*